(12) United States Patent
Liu et al.

(10) Patent No.: US 11,019,339 B2
(45) Date of Patent: May 25, 2021

(54) FRACTIONAL QUANTIZATION PARAMETER OFFSET IN VIDEO COMPRESSION

(71) Applicant: Futurewei Technologies, Inc., Plano, TX (US)

(72) Inventors: Shan Liu, San Jose, CA (US); Sergey Ikonin, Moscow (RU); Roman Chernyak, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 66 days.

(21) Appl. No.: 16/029,132

(22) Filed: Jul. 6, 2018

(65) Prior Publication Data

US 2019/0020875 A1    Jan. 17, 2019

Related U.S. Application Data

(60) Provisional application No. 62/531,727, filed on Jul. 12, 2017.

(51) Int. Cl.
*H04N 19/126* (2014.01)
*H04N 19/119* (2014.01)
(Continued)

(52) U.S. Cl.
CPC ......... *H04N 19/126* (2014.11); *H04N 19/119* (2014.11); *H04N 19/147* (2014.11);
(Continued)

(58) Field of Classification Search
CPC ........................... H04N 19/126; H04N 19/186
See application file for complete search history.

(56) References Cited

U.S. PATENT DOCUMENTS

| 8,526,495 B2 | 9/2013 | Liu et al. |
| 9,049,452 B2 | 6/2015 | Liu et al. |

(Continued)

FOREIGN PATENT DOCUMENTS

| CN | 103210647 A | 7/2013 |
| CN | 104205836 A | 12/2014 |

(Continued)

OTHER PUBLICATIONS

Flynn et al.: "Overview of the Range Extensions for the HEVC Standard: Tools, Profiles, and Performance," IEEE Transactions on Circuits and Systems for Video Technology, vol. 26, No. 1, Jan. 2016 (Year: 2016).*

(Continued)

*Primary Examiner* — Boubacar Abdou Tchoussou
(74) *Attorney, Agent, or Firm* — Conley Rose, P.C.

(57) ABSTRACT

A method of coding includes receiving a bitstream, obtaining a chroma quantization parameter range offset, a luma quantization parameter, quantization parameter offsets, and coefficients; calculating first intermediate chroma quantization parameters using the chroma quantization parameter range offset, the luma quantization parameter, and the quantization parameter offsets; where the first intermediate chroma quantization parameters have non-integer values; determining second intermediate chroma quantization parameters based on the first intermediate chroma quantization parameters, where the second intermediate chroma quantization parameters have non-integer values; calculating final chroma quantization parameters based on the second intermediate chroma quantization parameters and the chroma quantization parameter range offset; calculating a quantization step using the final chroma quantization parameters; quantizing the coefficients using the quantization step to produce quantized coefficients and transforming the quan- (Continued)

tized coefficients to residual pixels; and combining the residual pixels with prediction pixels to obtain reconstructed pixels.

11 Claims, 7 Drawing Sheets

(51) Int. Cl.
*H04N 19/147* (2014.01)
*H04N 19/176* (2014.01)
*H04N 19/186* (2014.01)
*H04N 19/91* (2014.01)
*H04N 19/192* (2014.01)
*H04N 19/70* (2014.01)

(52) U.S. Cl.
CPC ......... *H04N 19/176* (2014.11); *H04N 19/186* (2014.11); *H04N 19/192* (2014.11); *H04N 19/70* (2014.11); *H04N 19/91* (2014.11)

(56) References Cited

U.S. PATENT DOCUMENTS

| | | | |
|---|---|---|---|
| 9,363,511 B2 | 6/2016 | Zhang et al. | |
| 9,510,012 B2 | 11/2016 | Liu et al. | |
| 9,609,362 B2* | 3/2017 | Samuelsson | H04N 19/186 |
| 9,769,472 B2 | 9/2017 | Liu et al. | |
| 9,788,019 B2 | 10/2017 | Liu et al. | |
| 9,813,726 B2 | 11/2017 | Liu et al. | |
| 10,142,642 B2* | 11/2018 | Zhang | H04N 19/176 |
| 10,277,895 B2* | 4/2019 | Panusopone | H04N 19/105 |
| 10,448,056 B2* | 10/2019 | Li | H04N 19/50 |
| 2005/0238096 A1 | 10/2005 | Holcomb et al. | |
| 2008/0240250 A1* | 10/2008 | Lin | H04N 19/124 375/240.18 |
| 2009/0296808 A1* | 12/2009 | Regunathan | H04N 19/124 375/240.03 |
| 2012/0114034 A1 | 5/2012 | Huang et al. | |
| 2013/0259141 A1 | 10/2013 | Van der Auwera et al. | |
| 2013/0272390 A1* | 10/2013 | Joshi | H04N 19/176 375/240.03 |
| 2014/0003497 A1 | 1/2014 | Sullivan et al. | |
| 2014/0086323 A1 | 3/2014 | Chuang et al. | |
| 2015/0172719 A1 | 6/2015 | Guo et al. | |
| 2015/0256840 A1 | 9/2015 | Sato | |
| 2015/0358631 A1* | 12/2015 | Zhang | H04N 19/159 375/240.16 |
| 2015/0365692 A1 | 12/2015 | Liu et al. | |
| 2015/0373327 A1* | 12/2015 | Zhang | H04N 19/157 375/240.03 |
| 2016/0057419 A1 | 2/2016 | Francois et al. | |
| 2016/0100168 A1* | 4/2016 | Rapaka | H04N 19/12 375/240.03 |
| 2016/0142706 A1 | 5/2016 | Chuang et al. | |
| 2016/0261864 A1* | 9/2016 | Samuelsson | H04N 19/176 |
| 2016/0261865 A1 | 9/2016 | Li et al. | |
| 2016/0316206 A1 | 10/2016 | Sullivan et al. | |
| 2017/0272745 A1 | 9/2017 | Liu et al. | |
| 2017/0353730 A1 | 12/2017 | Liu et al. | |
| 2017/0374369 A1 | 12/2017 | Chuang et al. | |
| 2018/0020241 A1* | 1/2018 | Li | H04N 19/18 |
| 2018/0167615 A1* | 6/2018 | Kim | H04N 19/98 |
| 2018/0184083 A1* | 6/2018 | Panusopone | H04N 19/136 |
| 2019/0052878 A1* | 2/2019 | Zhao | H04N 19/124 |

FOREIGN PATENT DOCUMENTS

| | | |
|---|---|---|
| CN | 104584559 A | 4/2015 |
| CN | 104584560 A | 4/2015 |
| CN | 104871539 A | 8/2015 |
| CN | 105284112 A | 1/2016 |
| CN | 105432077 A | 3/2016 |
| WO | 2007025809 A2 | 3/2007 |

OTHER PUBLICATIONS

Foreign Communication From a Counterpart Application, PT Application No. PCT/CN2018/095180, English Translation of International Search Report dated Sep. 19, 2018, 7 pages.
Foreign Communication From a Counterpart Application, PT Application No. PCT/CN2018/095180, English Translation of Written Opinion dated Sep. 19, 2018, 5 pages.
"Series H: Audiovisual and Multimedia Systems, Infrastructure of audiovisual services—Coding of moving video, High efficiency video coding," ITU-T, H.265, Dec. 2016, 664 pages.
Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual communications and Image Processing, Jan. 20-25, 2002, 10 pages.
Liu, S., et al., Complexity Reduction of Joint Temporal-Spatial Bit Allocation Using R-D Models for Video Streaming, IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and memory efficient GOP structures supporting VCR functionalities in H. 264/AVC," IEEE International Symposium on Circuits and Systems, 2008, pp. 636-639.
Lou, J., et al., "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size NxN," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2NxN and Nx2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AFIG16 Unification of SDIP and NSQT," JCTVC-H0347, Feb. 1-10, 2012, 9 pages.

(56) References Cited

OTHER PUBLICATIONS

Zhang, X., et al., "Non-CE6: Intra mode coding with fixed length binarization," JCTVC-H0435, WG11 No. m23311, Feb. 1-10, 2012, 5 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222, Apr. 2013, 10 pages.
Lai, P., et al., "Non-SCE3.4: Simplified Generalized Combined Prediction," JCTVC-M0222_r1, Apr. 18-26, 2013, 9 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra BC merge mode with default candidates," JCTVC-50123, Oct. 17-24, 2014, 7 pages.
Xu, X., et al., "CE2 Test 12: Intra BC merge mode with default candidates," JCTVC-T0073, Feb. 10-18, 2015, 6 pages.

\* cited by examiner

FRACTIONAL QUANTIZATION PARAMETER OFFSET IN VIDEO COMPRESSION

CROSS-REFERENCE TO RELATED APPLICATIONS

This patent application claims the benefit of U.S. Provisional Patent Application No. 62/531,727, filed Jul. 12, 2017, by Shan Liu, et al., and titled "Fractional Quantization Parameter Offset in Video Compression," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method of coding implemented by a decoding device. The method includes receiving a bitstream from an encoding device; obtaining a chroma quantization parameter range offset, a luma quantization parameter, quantization parameter offsets, and coefficients from the bitstream using an entropy decoder; calculating first intermediate chroma quantization parameters using the chroma quantization parameter range offset, the luma quantization parameter, and the quantization parameter offsets; wherein one or more of the first intermediate chroma quantization parameters have non-integer values; determining second intermediate chroma quantization parameters based on the first intermediate chroma quantization parameters, wherein one or more of the second intermediate chroma quantization parameters have non-integer values; calculating final chroma quantization parameters based on the second intermediate chroma quantization parameters and the chroma quantization parameter range offset; calculating a quantization step using the final chroma quantization parameters; quantizing the coefficients using the quantization step to produce quantized coefficients and transforming the quantized coefficients to residual pixels; combining the residual pixels with prediction pixels to obtain reconstructed pixels; and displaying, on a display of an electronic device, an image generated using the reconstructed pixels.

Optionally, in any of the preceding aspects, another implementation of the aspect provides that the first intermediate chroma quantization parameters are calculated according to:

$qPiCb = \text{Clip3}(-QpBd\text{OffsetC}, 57, QpY+(pp\text{\_}cb\text{\_}qp\text{\_offset}+slice\text{\_}cb\text{\_}qp\text{\_offset})/2)$ $qPiCr = \text{Clip3}(-QpBd\text{OffsetC}, 57, QpY+(pp\text{\_}cr\text{\_}qp\text{\_offset}+slice\text{\_}cr\text{\_}qp\text{\_offset})/2)$ where $$\text{Clip3}(x, y, z) = \begin{cases} x; & z < x \\ y; & z > y \\ z; & \text{otherwise} \end{cases}, \quad QpBdOffsetC = 6 * (\text{bit\_depth\_chroma} - 8),$$

maximum allowed value for qPiCb and qPiCr, QpY represents a basic luma quantization parameter for a current slice, and pps_cb_qp_offset, slice_cb_qp_offset, pps_cr_qp_offset, and slice_cr_qp_offset represent the quantization parameter offsets.

Optionally, in any of the preceding aspects, another implementation of the aspect provides that the quantization parameter offsets comprise a picture parameter set quantization parameter offset and a slice quantization parameter offset, and wherein each of the first intermediate chroma quantization parameters is calculated by dividing a sum of the picture parameter set quantization parameter offset and the slice quantization parameter offset by 2.

Optionally, in any of the preceding aspects, another implementation of the aspect provides that the second intermediate chroma quantization parameters are obtained by mapping the first intermediate chroma quantization parameters to the second intermediate chroma quantization parameters using a table.

Optionally, in any of the preceding aspects, another implementation of the aspect provides that the second intermediate chroma quantization parameters are determined according to:

| | qPi | | | | | | | | | | | | | |
|---|---|---|---|---|---|---|---|---|---|---|---|---|---|---|
| | <29 | 29 | 29.5 | 30 | 30.5 | 31 | 31.5 | 32 | 32.5 | 33 | 33.5 | 34 | 34.5 | 35 | 35.5 |
| $Qp_C$ | =qPi | 28.5 | 29 | 29 | 29.5 | 30 | 30.5 | 31 | 31.5 | 32 | 32.5 | 33 | 33 | 33.5 | 33.5 |

| | qPi | | | | | | | | | | | | | |
|---|---|---|---|---|---|---|---|---|---|---|---|---|---|---|
| | 36 | 36.5 | 37 | 37.5 | 38 | 38.5 | 39 | 39.5 | 40 | 40.5 | 41 | 41.5 | 42 | 42.5 | 43 | >43 |
| $Qp_C$ | 34 | 34 | 34.5 | 34.5 | 35 | 35 | 35.5 | 35.5 | 36 | 36 | 36.5 | 36.5 | 37 | 37 | 37.5 | =qPi − 6 |

Optionally, in any of the preceding aspects, another implementation of the aspect provides that the quantization parameter offsets are in a range of −24 to +24, inclusive.

Optionally, in any of the preceding aspects, another implementation of the aspect provides that the quantization parameter offsets comprise a picture parameter set quantization parameter offset and a slice quantization parameter offset, and wherein each of the first chroma intermediate quantization parameters is calculated by dividing the picture parameter set quantization parameter offset by 2 to get a first quotient, dividing the slice quantization parameter offset by 2 to get a second quotient, and then summing the first quotient and the second quotient.

Optionally, in any of the preceding aspects, another implementation of the aspect provides that the first intermediate chroma quantization parameters are calculated according to:

$$qPiCb = \text{Clip3}(-QpBd\text{OffsetC}, 57, QpY + pps\_cb\_qp\_\text{offset}/2 + slice\_cb\_qp\_\text{offset}/2)$$

$$qPiCr = \text{Clip3}(-QpBd\text{OffsetC}, 57, QpY + pps\_cr\_qp\_\text{offset}/2 + slice\_cr\_qp\_\text{offset}/2)$$

where $$\text{Clip3}(x, y, z) = \begin{cases} x; & z < x \\ y; & z > y \\ z; & \text{otherwise} \end{cases}, \quad QpBdOffsetC = 6 * (\text{bit\_depth\_chroma} - 8),$$

maximum allowed value for qPiCb and qPiCr, QpY represents a basic luma quantization parameter for a current slice, and pps_cb_qp_offset, slice_cb_qp_offset, pps_cr_qp_offset, and slice_cr_qp_offset represent the quantization parameter offsets.

Optionally, in any of the preceding aspects, another implementation of the aspect provides that the quantization parameter offsets comprise a picture parameter set quantization parameter offset and a slice quantization parameter offset, and wherein each of the picture parameter set quantization parameter offset and the slice quantization parameter offset is right shifted by 1.

Optionally, in any of the preceding aspects, another implementation of the aspect provides that a precision of at least one of the first intermediate chroma quantization parameters and the second intermediate chroma quantization parameters is 0.5.

Optionally, in any of the preceding aspects, another implementation of the aspect provides that the quantization step is calculated according to:

$$Q\text{step}(QP) = (2^{1/6})^{QP-4}$$

where QP represents final chroma quantization parameters.

In an embodiment, the disclosure includes a method of coding implemented by a decoding device. The method includes receiving a bitstream from an encoding device; obtaining a chroma quantization parameter range offset, a luma quantization parameter, quantization parameter offsets, fractional quantization parameter offsets, and coefficients from the bitstream using an entropy decoder; calculating first intermediate chroma quantization parameters using the chroma quantization parameter range offset, the luma quantization parameter, and the quantization parameter offsets; determining second intermediate chroma quantization parameters based on the first intermediate chroma quantization parameters; calculating fractional chroma quantization parameters based on the second intermediate chroma quantization parameters and the fractional quantization parameter offsets; calculating a quantization step using the fractional chroma quantization parameters; quantizing the coefficients using the quantization step to produce quantized coefficients and transforming the quantized coefficients to residual pixels; combining the residual pixels with prediction pixels to obtain reconstructed pixels; and displaying, on a display of an electronic device, an image generated using the reconstructed pixels.

Optionally, in any of the preceding aspects, another implementation of the aspect provides that the fractional chroma quantization parameters are determined according to:

$$QP_{Cb\_fracPrec} = ((QP_{Cb}) << K + pps\_\text{frac}\_cb\_qp\_\text{offset} + slice\_\text{frac}\_cb\_qp\_\text{offset})/(2^{\wedge}K)$$

$$QP_{Cr\_fracPrec} = ((QP_{Cr}) << K + pps\_\text{frac}\_cr\_qp\_\text{offset} + slice\_\text{frac}\_cr\_qp\_\text{offset})/(2^{\wedge}K)$$

where $QP_{Cb}$ and $QP_{Cr}$ represent an integer part of final chroma quantization parameters, K is a fractional chroma quantization parameter offset precision, K represents a level of fractional precision, and pps_frac_cr_qp_offset and slice_frac_cr_qp_offset represent fractional quantization parameter offsets.

Optionally, in any of the preceding aspects, another implementation of the aspect provides that the fractional chroma quantization parameters are determined according to:

$$QP_{Cb\_fracPrec} = F(qPi)*(1.0 - (pps\_\text{frac}\_cb\_qp\_\text{offset} + slice\_\text{frac}\_cb\_qp\_\text{offset})/(2^{\wedge}K) + F(qPi+1)*(pps\_\text{frac}\_cb\_qp\_\text{offset} + slice\_\text{frac}\_cb\_qp\_\text{offset})/(2^{\wedge}K),$$

$$QP_{Cr\_fracPrec} = F(qPi)*(1.0 - (pps\_\text{frac}\_cr\_qp\_\text{offset} + slice\_\text{frac}\_cr\_qp\_\text{offset})/(2^{\wedge}K) + F(qPi+1)*(pps\_\text{frac}\_cr\_qp\_\text{offset} + slice\_\text{frac}\_cr\_qp\_\text{offset})/(2^{\wedge}K),$$

where F(qPi) represents a function of the first intermediate chroma quantization parameters, and pps_frac_cr_qp_offset and slice_frac_cr_qp_offset represent fractional quantization parameter offsets, and K is a fractional chroma quantization parameter offset precision.

Optionally, in any of the preceding aspects, another implementation of the aspect provides that the fractional quantization parameter offsets comprise pps_frac_cb_qp_offset, slice_frac_cb_qp_offset, pps_frac_cr_qp_offset, and slice_frac_cr_qp_offset.

Optionally, in any of the preceding aspects, another implementation of the aspect provides that the quantization parameter offsets are in a range of 0 to 2^K−1, inclusive, and wherein K represents a level of fractional precision.

In an embodiment, the disclosure includes a method of coding implemented by an encoding device. The method includes dividing a picture into a plurality of blocks containing original pixels; subtracting prediction pixels from the original pixels to obtain residual pixels for each of the blocks; calculating rate distortion costs for both luma and chroma for different modes based on a fractional chroma weight; selecting one of the rate distortion costs; transforming residual pixels into coefficients based on the one of the rate distortion costs that was selected; quantizing the coefficients by step size to get quantized coefficients; generating, using an entropy encoder, a bitstream based on the quantized coefficients; and transmitting the bitstream to a decoding device.

Optionally, in any of the preceding aspects, another implementation of the aspect provides that the fractional chroma weight is calculated as follows:

$$ChromaWeight_{fracprec}=F(QPy+\text{chroma\_qp\_offset})*(1.0-(pps\_\text{frac\_cb\_qp\_offset}+slice\_\text{frac\_cb\_qp\_offset})/(2\hat{}K)+F(QPy+\text{chroma\_qp\_offset})*(pps\_\text{frac\_cb\_qp\_offset}+slice\_\text{frac\_cb\_qp\_offset})/(2\hat{}K).$$

where F represents a function, QpY represents a basic luma quantization parameter, where chroma_qp_offset is a chroma quantization parameter offset, pps_frac_cb_qp_offset, slice_frac_cb_qp_offset, pps_frac_cr_qp_offset, and slice_frac_cr_qp_offset are fractional quantization parameter offsets, and K represents a level of fractional precision.

In an embodiment, the disclosure includes a method of coding implemented by a decoding device. The method includes receiving a bitstream from an encoding device; obtaining a luma quantization parameter, quantization parameter absolute value, quantization parameter sign, and coefficients from the bitstream using an entropy decoder; calculating a quantization parameter delta value based on the quantization parameter absolute value and the quantization parameter sign, wherein the quantization parameter delta value has a non-integer value; calculating a final luma quantization parameter by adding the quantization parameter delta value to the luma quantization parameter; calculating a quantization step using the final luma quantization parameter; quantizing the coefficients using the quantization step to produce quantized coefficients and transforming the quantized coefficients to residual pixels; combining the residual pixels with prediction pixels to obtain reconstructed pixels; and displaying, on a display of an electronic device, an image generated using the reconstructed pixels.

Optionally, in any of the preceding aspects, another implementation of the aspect provides that the quantization parameter delta value is calculated according to:

$$CuQp\text{DeltaVal}=cu\_qp\_delta\_abs*(1-2*cu\_qp\_delta\_sign\_flag)/2.$$

where cu_qp_delta_abs represents the quantization parameter absolute value and cu_qp_delta_sign_flag represents the quantization parameter sign.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
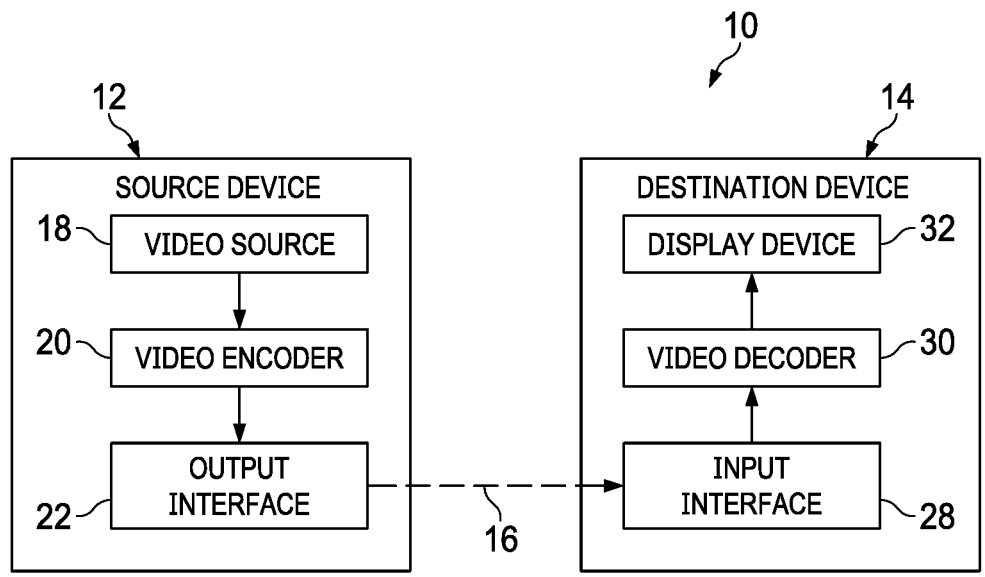
FIG. 1 is a block diagram illustrating an example coding system that may utilize fractional quantization parameter offset techniques.

FIG. 1 is a block diagram illustrating an example coding system 10 that may utilize fractional quantization parameter offset techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 22. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for fractional quantization parameter offset may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
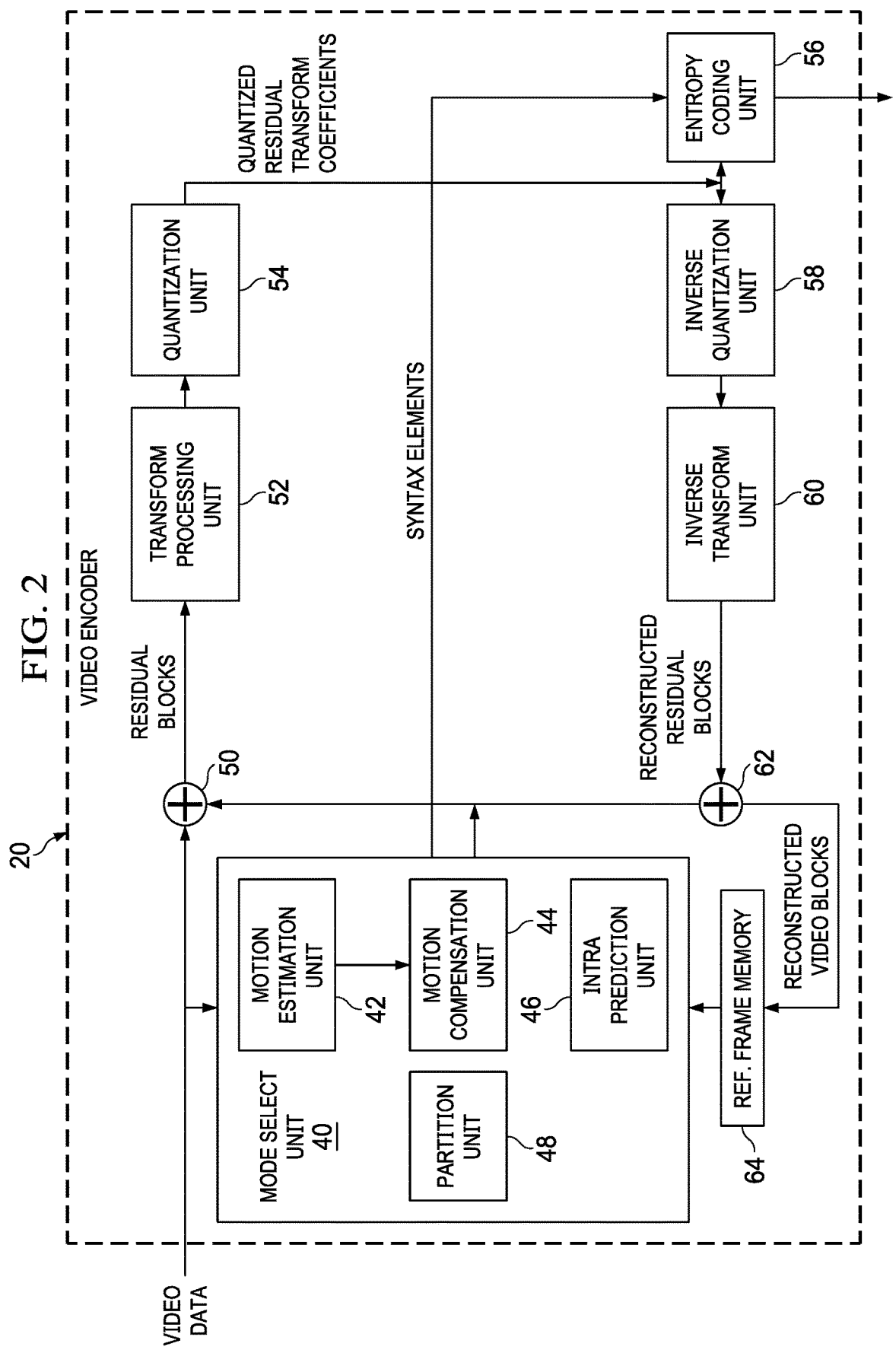
FIG. 2 is a block diagram illustrating an example video encoder that may implement fractional quantization parameter offset techniques.

FIG. 2 is a block diagram illustrating an example of video encoder 20 that may implement fractional quantization parameter offset techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of a LCU into sub-CUs. Leaf-node CUs of the quadtree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
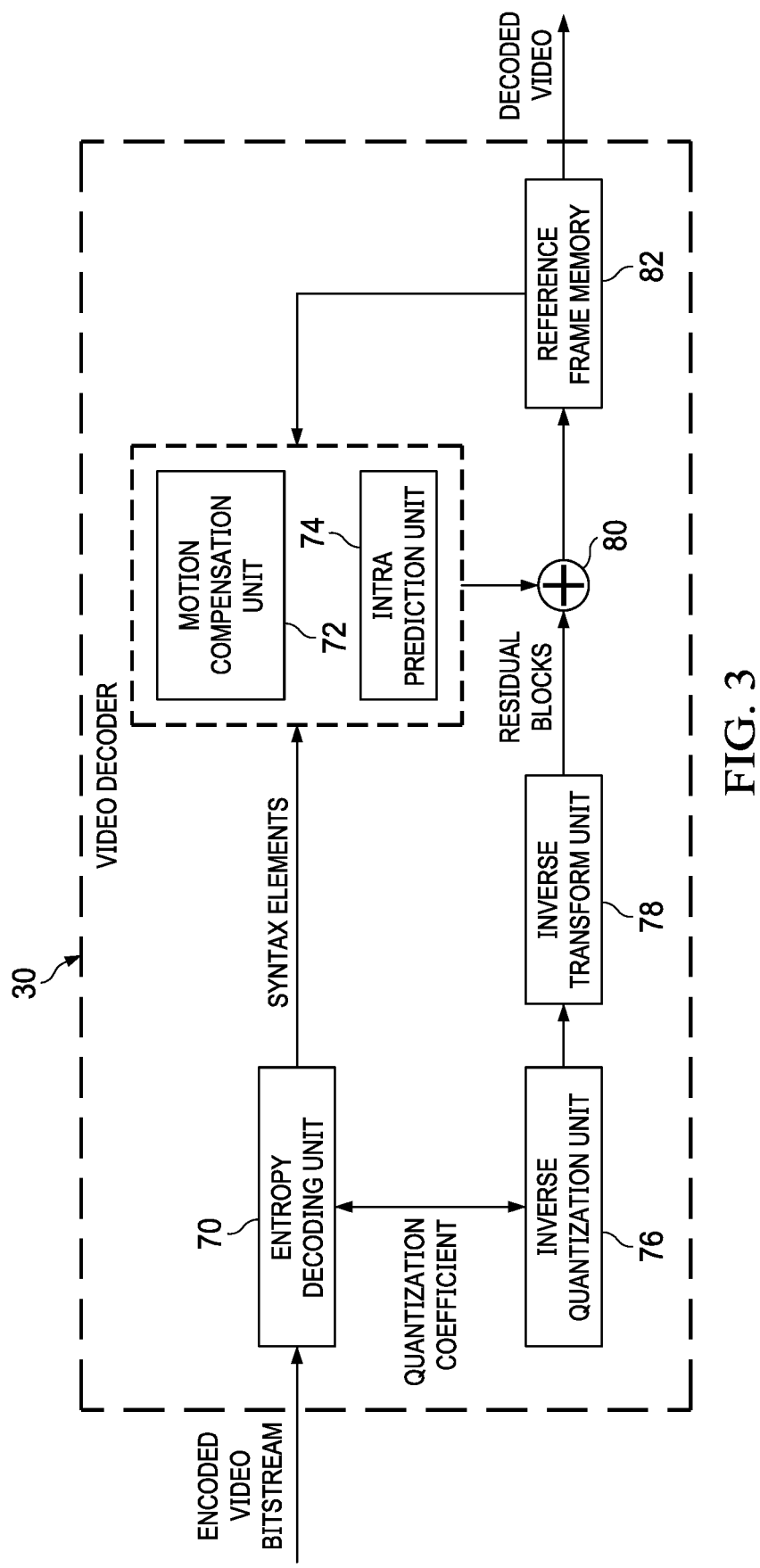
FIG. 3 is a block diagram illustrating an example of a video decoder that may implement fractional quantization parameter offset techniques.

FIG. 3 is a block diagram illustrating an example of video decoder 30 that may implement fractional quantization parameter offset techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (i.e., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

As will be appreciated by those in the art, the coding system 10 of FIG. 1 is suitable for implementing various video coding or compression techniques. One aspect of video coding, which is common for all hybrid video codec's, is a quantization procedure. A quantization parameter (QP) is one of the basic codec's parameters and is used for calculating the actual quantization step. The quantization procedure allows an amount of transmitted information to be reduced with a reasonable decrease in video quality.

For H.264/AVC and H.265/HEVC, the quantization parameter is the input codec quantization parameter that allows a trade-off to vary between distortion introduced by the codec and the bit rate of the bitstream. The quantization parameter is an integer parameter in range [0, 51] inclusively, where 0 means no distortion and 51 means maximal distortion introduced by the coding process. Based on the quantization parameter value, both quantization steps for luma and for chroma are computed. However, in some cases it is useful to specify a different quantization parameter for chroma. For handling such situations without transmitting another whole value for each chroma plane, in current video compression standards the chroma quantization parameter offset was introduced for both chroma components. The chroma quantization parameter offset allows a certain chroma quantization parameter value to be specified based on a luma quantization parameter.

In an embodiment, the following terms have the following meanings unless otherwise defined by the context of the present disclosure. A sequence parameter set (SPS) is a set of coding parameters which are transmitted for a series of pictures. The SPS contains data that is common to all the pictures in the series of pictures. A picture parameter set (PPS) is a set of coding parameters which are transmitted for one or more pictures. The PPS contains data that is common to the entire picture. A slice header (SH) is coding information that belongs to each certain slice. A ChromaArrayType is a variable that specifies a type of chroma sub sampling where 0 means monochrome, 1 means 4:2:0 chroma sub-sampling, 2 means 4:2:2 chroma sub-sampling, and 3 means 4:4:4 chroma sub-sampling.

In the HEVC standard, the chroma quantization parameter offsets are signaled in PPS and the slice header. The syntax tables are as follows:

| | |
|---|---|
| pps_cb_qp_offset | se(v) |
| pps_cr_qp_offset | se(v) |
| pps_slice_chroma_qp_offsets_present_flag | u(1) | and

| | |
|---|---|
| if( pps_slice_chroma_qp_offsets_present_flag ) { | |
|    slice_cb_qp_offset | se(v) |
|    slice_cr_qp_offset | se(v) |
| } | |

The corresponding semantics of above syntax elements are as follows.

The pps_cb_qp_offset and pps_cr_qp_offset specifies the offsets to the luma quantization parameter Qp'Y used for deriving Qp'Cb and Qp'Cr, respectively. The values of pps_cb_qp_offset and pps_cr_qp_offset are in the range of −12 to +12, inclusive. When ChromaArrayType is equal to 0, pps_cb_qp_offset and pps_cr_qp_offset are not used in the decoding process and decoders shall ignore their value.

The pps_slice_chroma_qp_offsets_present_flag equal to 1 indicates that the slice_cb_qp_offset and slice_cr_qp_offset syntax elements are present in the associated slice headers. The pps_slice_chroma_qp_offsets_present_flag equal to 0 indicates that these syntax elements are not present in the associated slice headers.

The slice_cb_qp_offset specifies a difference to be added to the value of pps_cb_qp_offset when determining the value of the Qp'Cb quantization parameter. The value of slice_cb_qp_offset is in the range of −12 to +12, inclusive. When the slice_cb_qp_offset is not present, it is inferred to be equal to 0. The value of pps_cb_qp_offset+slice_cb_qp_offset is in the range of −12 to +12, inclusive.

The slice_cr_qp_offset specifies a difference to be added to the value of pps_cr_qp_offset when determining the value of the Qp'Cr quantization parameter. The value of slice_cr_qp_offset is in the range of −12 to +12, inclusive. When the slice_cr_qp_offset is not present, it is inferred to be equal to 0. The value of pps_cr_qp_offset+slice_cr_qp_offset is in the range of −12 to +12, inclusive.

Later on, the quantization parameters of Cb and Cr, which may be referred to as first intermediate chroma quantization parameters, are calculated as:

$$qPiCb=\text{Clip3}(-QpBd\text{Offset}C, 57, QpY+pps\_cb\_qp\_\text{offset}+slice\_cb\_qp\_\text{offset})$$

$$qPiCr=\text{Clip3}(-QpBd\text{Offset}C, 57, QpY+pps\_cr\_qp\_\text{offset}+slice\_cr\_qp\_\text{offset}),$$

where $$\text{Clip3}(x, y, z) = \begin{cases} x; & z < x \\ y; & z > y \\ z; & \text{otherwise} \end{cases}$$

$$QpBdOffsetC = 6*(\text{bit\_depth\_chroma} - 8),$$

57 represents a maximum allowed value for qPiCb and qPiCr, and

QpY is a basic luma quantization parameter for the current slice

The calculated $qPi_{Cb}$ and $qPi_{Cr}$, which may be referred to as first intermediate chroma quantization parameters, are used to determine $Qp_{Cb}$ and $Qp_{Cr}$, which may be referred to as second intermediate chroma quantization parameters, based on the mapping in Table 1. In Table 1, the first intermediate chroma quantization parameters ($qPi_{Cb}$ and $qPi_{Cr}$) are collectively represented by the index qPi and the second intermediate chroma quantization parameters ($Qp_{Cb}$ and $Qp_{Cr}$) are collectively represented by the index $Qp_C$.

TABLE 1

Specification of $Qp_C$ as a function of qPi

| qPi | | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

Thereafter, the final chroma quantization parameters for the Cb and Cr components, $Qp'_{Cb}$ and $Qp'_{Cr}$, are derived as follows:

$$Qp'_{Cb}=qP_{Cb}+QpBd\text{Offset}_C$$

$$QP'_{Cr}=qP_{Cr}+QpBd\text{Offset}_C$$

where $qP_{Cb}$ is equal to the Cb component of $Qp_C$ from Table 1, where $qP_{Cr}$ is the Cr component of $Qp_C$ from Table 1, and $QpBdOffset_C$ is a chroma quantization parameter range offset that was obtained from the bitstream.

The quantization parameter defines a quantization step for scalar quantizer of residuals. In HEVC the following formula is used to determine the quantization step:

$$Q\text{step}(QP)=(2^{1/6})^{QP-4}$$

where QP represents the final quantization parameters that were calculated.

Because the above described coding process is restricted to integer values for the chroma quantization parameters, coding precision is limited. Disclosed herein is a set of methods for enabling fractional chroma QP offset such that a finer level of chroma quality adjustment relevant to luma quality may be achieved. The present disclosure also presents methods for enabling fractional delta QP offset for luma components at a coding block level such that a finer level of quality adjustment for local blocks and regions may be achieved.

The existing solution as in HEVC standard only signals integer chroma QP offset. However, in some circumstances a finer chroma QP offset may be desirable to achieve more balanced luma and chroma coding quality. This present disclosure presents a set of methods to allow the signaling and utilization of a fractional chroma QP offset.

In the first method, the syntax tables may be the same as in the existing solution as described above, but semantics and decoding calculation processes are modified as follows. In the first embodiment, the following are used.

The pps_cb_qp_offset and pps_cr_qp_offset specify the offsets to the luma quantization parameter Qp'Y used for deriving Qp'Cb and Qp'Cr, respectively. The values of pps_cb_qp_offset and pps_cr_qp_offset are in the range of −24 to +24, inclusive. When ChromaArrayType is equal to 0, the pps_cb_qp_offset and the pps_cr_qp_offset are not used in the decoding process and decoders shall ignore their value.

The slice_cb_qp_offset specifies a difference to be added to the value of pps_cb_qp_offset when determining the value of the Qp'Cb quantization parameter. The value of slice_cb_qp_offset is in the range of −24 to +24, inclusive. When slice_cb_qp_offset is not present, it is inferred to be equal to 0. The value of pps_cb_qp_offset+slice_cb_qp_offset are in the range of −24 to +24, inclusive.

The slice_cr_qp_offset specifies a difference to be added to the value of pps_cr_qp_offset when determining the value of the Qp'Cr quantization parameter. The value of slice_cr_qp_offset is in the range of −24 to +24, inclusive. When the slice_cr_qp_offset is not present, it is inferred to be equal to 0. The value of pps_cr_qp_offset+slice_cr_qp_offset is in the range of −24 to +24, inclusive.

Later on in the decoding process the quantization parameters of Cb and Cr are calculated as:

$$qPiCb=\text{Clip3}(-QpBd\text{Offset}C, 57, QpY+(pps\_cb\_qp\_\text{offset}+slice\_cb\_qp\_\text{offset})/2)$$

$$qPiCr=\text{Clip3}(-QpBd\text{Offset}C, 57, QpY+(pps\_cr\_qp\_\text{offset}+slice\_cr\_qp\_\text{offset})/2)$$

Here parameters qPiCb and qPiCr may be non-integer numbers, and 57 represents a maximum allowed value for qPiCb and qPiCr. In this example, the precision is up to 0.5. Consequently, the Table 1 stated above is modified as follows and shown in Table 2:

TABLE 2

Specification of $Qp_C$ as a function of qPi

| qPi | <29 | 29 | 29.5 | 30 | 30.5 | 31 | 31.5 | 32 | 32.5 | 33 | 33.5 | 34 | 34.5 | 35 | 35.5 |
|---|---|---|---|---|---|---|---|---|---|---|---|---|---|---|---|
| $Qp_C$ | =qPi | 28.5 | 29 | 29 | 29.5 | 30 | 30.5 | 31 | 31.5 | 32 | 32.5 | 33 | 33 | 33.5 | 33.5 |

| qPi | 36 | 36.5 | 37 | 37.5 | 38 | 38.5 | 39 | 39.5 | 40 | 40.5 | 41 | 41.5 | 42 | 42.5 | 43 | >43 |
|---|---|---|---|---|---|---|---|---|---|---|---|---|---|---|---|---|
| $Qp_C$ | 34 | 34 | 34.5 | 34.5 | 35 | 35 | 35.5 | 35.5 | 36 | 36 | 36.5 | 36.5 | 37 | 37 | 37.5 | =qPi − 6 |

The final chroma quantization parameters for the Cb and Cr components, Qp'Cb and Qp'Cr, are derived as previous:

$$Qp'_{Cb} = qP_{Cb} + QpBd\text{Offset}_C$$

$$Qp'_{Cr} = qP_{Cr} + QpBd\text{Offset}_C$$

In an embodiment, the following are used.

The pps_cb_qp_offset and pps_cr_qp_offset specify the offsets to the luma quantization parameter Qp'Y used for deriving Qp'Cb and Qp'Cr, respectively. The values of pps_cb_qp_offset>>1 and pps_cr_qp_offset>>1 are in the range of −12 to +12, inclusive. When ChromaArrayType is equal to 0, the pps_cb_qp_offset and pps_cr_qp_offset are not used in the decoding process and decoders shall ignore their value.

The slice_cb_qp_offset specifies a difference to be added to the value of pps_cb_qp_offset when determining the value of the Qp'Cb quantization parameter. The value of slice_cb_qp_offset>>1 is in the range of −12 to +12, inclusive. When slice_cb_qp_offset is not present, it is inferred to be equal to 0. The value of pps_cb_qp_offset>>1+slice_cb_qp_offset>>1 is in the range of −12 to +12, inclusive.

The slice_cr_qp_offset specifies a difference to be added to the value of pps_cr_qp_offset when determining the value of the Qp'Cr quantization parameter. The value of slice_cr_qp_offset>>1 is in the range of −12 to +12, inclusive. When the slice_cr_qp_offset is not present, it is inferred to be equal to 0. The value of pps_cr_qp_offset>>1+slice_cr_qp_offset>>1 is in the range of −12 to +12, inclusive.

Later on in the decoding process, the quantization parameters of Cb and Cr are calculated as:

$$qPiCb = \text{Clip3}(-QpBd\text{Offset}_C, 57, QpY + pps\_cb\_qp\_\text{offset}/2 + slice\_cb\_qp\_\text{offset}/2)$$

$$qPiCr = \text{Clip3}(-QpBd\text{Offset}_C, 57, QpY + pps\_cr\_qp\_\text{offset}/2 + slice\_cr\_qp\_\text{offset}/2)$$

Similar to the previous embodiment, the parameters qPiCb and qPiCr may be non-integer numbers, and 57 represents a maximum allowed value for qPiCb and qPiCr.

Figure 4:
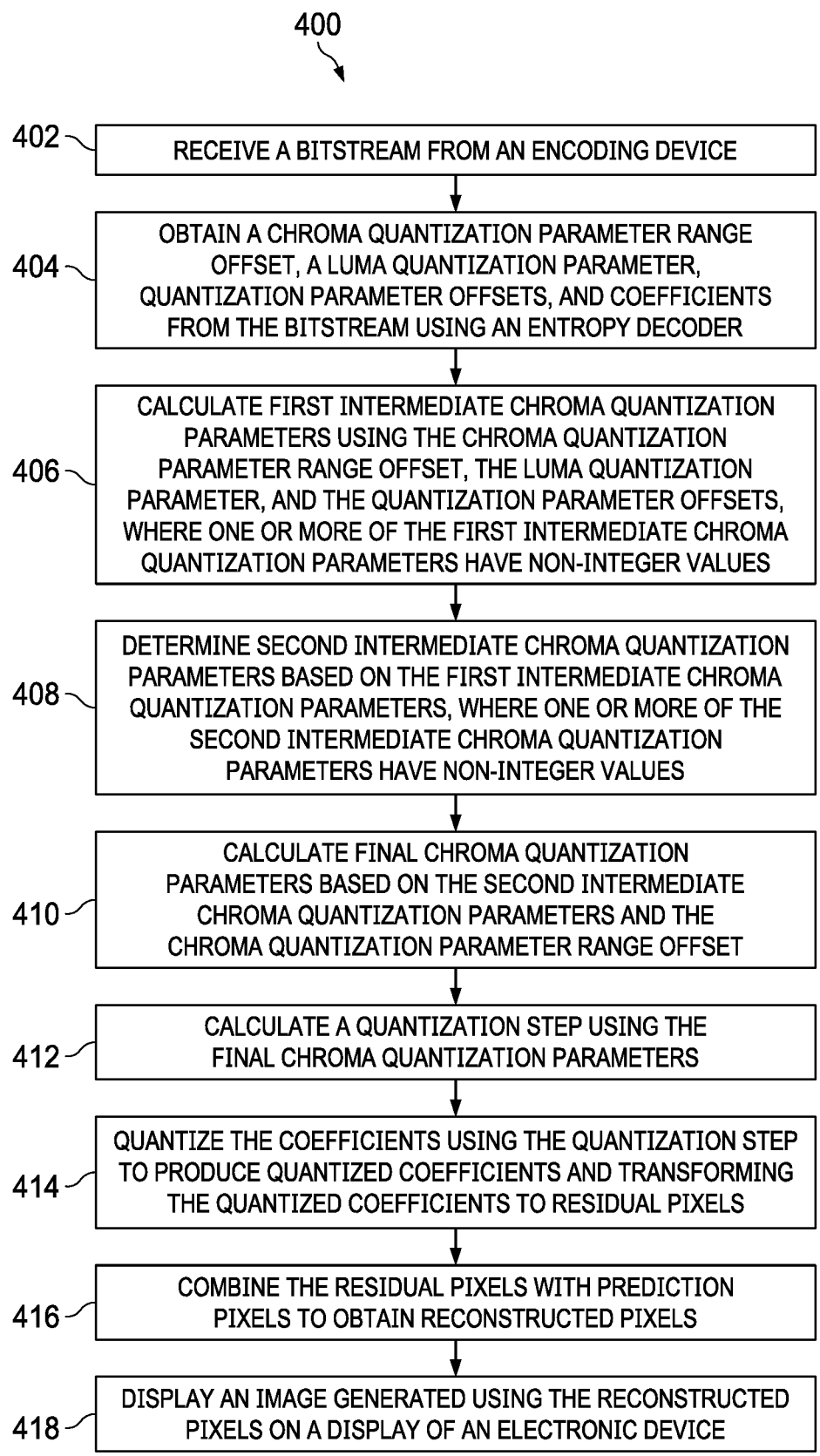
FIG. 4 is an embodiment of a coding method.

FIG. 4 is a flowchart illustrating an embodiment of a method of coding 400. The method of coding 400 may be performed by a decoder such as the video decoder 30 of FIG. 1. The method may be performed, for example, when coding with a finer, non-integer level of precision is desired.

In block 402, a bitstream is received from an encoding device such as the video encoder 20 in FIG. 1. In block 404, a chroma quantization parameter range offset (e.g., QpBDOffsetC), a luma quantization parameter (e.g., QpY), quantization parameter offsets (e.g., pps_cb_qp_offset, slice_cb_qp_offset, pps_cr_qp_offset, slice_cr_qp_offset), and coefficients are obtained from the bitstream using an entropy decoder such as the entropy decoding unit 70 in FIG. 3.

In block 406, first intermediate chroma quantization parameters (e.g., qPiCb, qPiCr) are calculated using the chroma quantization parameter range offset, the luma quantization parameter, and the quantization parameter offsets. In an embodiment, one or more of the first intermediate chroma quantization parameters have non-integer values (e.g., 0.5, 0.25, 0.1, etc.). In block 408, second intermediate chroma quantization parameters (e.g., $QP_{Cb}$, $QP_{Cr}$) are determined based on the first intermediate chroma quantization parameters. In an embodiment, one or more of the second intermediate chroma quantization parameters have non-integer values.

In block 410, final chroma quantization parameters (e.g., $Q'P_{Cb}$, $Q'P_{Cr}$) are calculated based on the second intermediate chroma quantization parameters and the chroma quantization parameter range offset. In block 412, a quantization step is calculated using the final chroma quantization parameters. In block 414, the coefficients are quantized using the quantization step to produce quantized coefficients and the quantized coefficients are transformed to residual pixels.

In block 416, the residual pixels are combined with prediction pixels to obtain reconstructed pixels. In an embodiment, the prediction pixels are obtained from the bitstream. In an embodiment, the prediction pixels are based on previously coded pictures or images. In block 418, an image generated using the reconstructed pixels is displayed on the display of an electronic device.

Some of the above embodiments are examples assuming the range of the chroma QP offset is between [−12, 12], inclusive, and that the fractional precision supports up to ½. These methods may be generalized to other chroma QP offset ranges and fractional precisions. In one example, the "/2" in above descriptions may be replaced by "/K", and the "−24" and "+24" may be modified to "−(12*K)" and "+(12*K)." In this example, the fractional precision that the chroma QP offset may go up to is 1/K. In another example, the "/2" in above descriptions may be replaced by "/K", and the "−24" and "+24" may be modified to "−N" and "+N."

In addition, a flag may be signaled in sequence parameter set (SPS), picture parameter set (PPS), or slice header (SH) to indicate whether fractional chroma QP offset is allowed or not, e.g., enabled or disabled for the current sequence, picture, and slice, respectively. If this flag is ON, then the meanings of the syntax elements, e.g., semantics, and the calculations of the chroma QP offsets use the methods provided in the present disclosure. In addition, precision (K) for fractional chroma QP offset may also be signaled. Otherwise, if the flag is OFF, then the meanings of the syntax elements, e.g., semantics, and the calculations of the chroma QP offsets use the existing solutions such as in HEVC. A few example syntax tables are provided as follows.

| | Descriptor |
|---|---|
| pic_parameter_set_rbsp( ) { | |
| ... | |
|   pps_slice_chroma_qp_offsets_present_flag | u(1) |
|   pps_fractional_chroma_qp_offset_enabled_flag | u(1) |
|   pps_cb_qp_offset | se(v) |
|   pps_cr_qp_offset | se(v) |
| ... | |
| } | |

In the above syntax table, a flag "pps_fractional_chroma_qp_offset_enabled_flag" is added to PPS. This flag equal to 1 indicates that fractional chroma QP offset may be used in the current picture or pictures that are associated with this PPS. This flag equal to 0 indicates that fractional chroma QP offset may not be used (e.g., only integer chroma QP offset may be used) in the current picture or pictures that are associated with this PPS.

| | Descriptor |
|---|---|
| slice_segment_header( ) { | |
| ... | |
|   if( pps_slice_chroma_qp_offsets_present_flag ) { | |
|     slice_fractional_chroma_qp_offset_enabled_flag | u(1) |
|     slice_cb_qp_offset | se(v) |
|     slice_cr_qp_offset | se(v) |
|   } | |
| ... | |
| } | |

In the above syntax table, a flag "slice_fractional_chroma_qp_offset_enabled_flag" is added to slice header. This flag equal to 1 indicates that fractional chroma QP offset may be used in the current slice. This flag equal to 0 indicates that fractional chroma QP offset may not be used (e.g., only integer chroma QP offset may be used) in the current slice. When not present, the flag is inferred to be equal to 0.

Alternatively, the flag "slice_fractional_chroma_qp_offset_enabled_flag" is signaled only when pps_fractional_chroma_qp_offset_enabled_flag is ON. That is, the fractional chroma QP offset is only allowed for the current slice when it is allowed for the current picture. When not present, the flag is inferred to be equal to 0.

| | Descriptor |
|---|---|
| slice_segment_header( ) { | |
| ... | |
|   if( pps_slice_chroma_qp_offsets_present_flag ) { | |
|     slice_cb_qp_offset | se(v) |
|     slice_cr_qp_offset | se(v) |
|     if( pps_fractional_chroma_qp_offset_enabled_flag ) | |
|       slice_fractional_chroma_qp_offset_enabled_flag | u(1) |
|   } | |
| ... | |
| } | |

In addition, syntax tables with varible precisions of fractional chroma QP offset are given.

| | Descriptor |
|---|---|
| pic_parameter_set_rbsp( ) { | |
| ... | |
|   pps_slice_chroma_qp_offsets_present_flag | u(1) |
|   pps_fractional_chroma_qp_offset_enabled_flag | u(1) |
|   if( pps_fractional_chroma_qp_offset_enabled_flag ) | |
|     pps_fractional_chroma_qp_offset_precision | u(v)/ ue(v)/ se(v) |
|   pps_cb_qp_offset | se(v) |
|   pps_cr_qp_offset | se(v) |
| ... | |
| } | |

In the above syntax table, a flag "pps_fractional_chroma_qp_offset_precision" is added to PPS. This field defines the precision (K) for fractional chroma QP offset that may be used in the current picture or pictures that are associated with this PPS. This field equal to 0 indicates that fractional chroma QP offset may not be used (i.e., only integer chroma QP offset may be used) in the current picture or pictures that are associated with this PPS. When this syntax element is not signaled, its value is inferred to be equal to 0. In one embodiment, this syntax element is coded by various length coding. The value 0 is given the shortest (1 bin) codeword.

| | Descriptor |
|---|---|
| slice_segment_header( ) { | |
| ... | |
|   if( pps_slice_chroma_qp_offsets_present_flag ) { | |
|     slice_fractional_chroma_qp_offset_precision | u(v)/ ue(v)/ se(v) |
|     slice_cb_qp_offset | se(v) |
|     slice_cr_qp_offset | se(v) |
|   } | |
| ... | |
| } | |

In above syntax table, a flag "slice_fractional_chroma_qp_offset_precision" is added to the slice header. This field defines the precision (K) for fractional chroma QP offset that may be used in the current slice. This field equal to 0 indicates that fractional chroma QP offset may not be used (e.g., only integer chroma QP offset may be used) in the current slice.

Alternatively, the flag "slice_fractional_chroma_qp_offset_precision" is signaled only when slice_fractional_chroma_qp_offset_enabled_flag is ON. That is, the slice level fractional chroma QP offset precision is only signaled for the current slice when fractional chroma QP offset is allowed for the current slice. When this syntax element is not signaled, its value is inferred to be equal to 0. In one embodiment, this syntax element is coded by various length coding. The value 1 is given the shortest (1 bin) codeword, which indicates ½ precision.

| | Descriptor |
|---|---|
| slice_segment_header( ) { | |
| ... | |
|   if( pps_slice_chroma_qp_offsets_present_flag ) { | |
|     slice_cb_qp_offset | se(v) |
|     slice_cr_qp_offset | se(v) |
|     if( slice_fractional_chroma_qp_offset_enabled_flag ) | |
|       slice_fractional_chroma_qp_offset_precision | u(v)/ ue(v)/ se(v) |
|   } | |
| ... | |
| } | |

In another method, the integer part of quantization parameter QpC is derived using the existing solution such as in HEVC. To get fractional QpC precision, additional syntax elements such as pps_slice_chroma_frac_qp_offsets_precision, pps_frac_cb_qp_offset, pps_frac_cr_qp_offset, slice_frac_cb_qp_offset, and slice_frac_cr_qp_offset may be signaled and used on PPS or slice header level. A few example syntax tables are provided as follows.

| | Descriptor |
|---|---|
| pic_parameter_set_rbsp( ) { | |
| ... | |
|   pps_fractional_chroma_qp_offset_enabled_flag | u(1) |
|   if( pps_fractional_chroma_qp_offset_enabled_flag ) { | |
|     pps_chroma_frac_qp_offsets_precision | u(v)/ ue(v)/ se(v) |
|     pps_frac_cb_qp_offset | se(v) |
|     pps_frac_cr_qp_offset | se(v) |
|     pps_slice_chroma_frac_qp_offsets_present_flag | u(1) |
|   } | |
|   ... | |
| } | | and

| | Descriptor |
|---|---|
| slice_segment_header( ) { | |
| ... | |
|   if (pps_slice_chroma_frac_qp_offsets_present_flag) { | |
|     slice_chroma_frac_qp_offsets_precision | u(v)/ ue(v)/ se(v) |
|     slice_frac_cb_qp_offset | se(v) |
|     slice_frac_cr_qp_offset | se(v) |
|   } | |
| ... | |
| } | |

The corresponding semantics of the above syntax elements are as follows.

The pps_chroma_frac_qp_offsets_precision specifies the precision of the fractional chroma qp offsets used in the current picture or pictures refer to this PPS. When not present, the value of this syntax element is inferred to be equal to 0, which indicates integer chroma QP offset precision. A value K that is greater than 0 indicates fractional chroma QP offset precision equal to $1/(2^K)$.

The pps_frac_cb_qp_offset and pps_frac_cr_qp_offset specify the fractional offsets to integer part of quantization parameter QpC used for deriving final values Qp'Cb and Qp'Cr, respectively. The values of pps_frac_cb_qp_offset and pps_frac_cr_qp_offset are in the range of 0 to $2^K-1$, inclusive. When ChromaArrayType is equal to 0, pps_cb_qp_offset and pps_cr_qp_offset are not used in the decoding process and decoders shall ignore their value.

The pps_slice_chroma_frac_qp_offsets_present_flag equal to 1 indicates that the slice_frac_cb_qp_offset offset and slice_frac_cr_qp_offset syntax elements are present in the associated slice headers. The pps_slice_chroma_frac_qp_offsets_present_flag equal to 0 indicates that these syntax elements are not present in the associated slice headers. When not present, the value of this flag is inferred to be equal to 0.

The slice_frac_cb_qp_offset specifies a difference to be added to the value of pps_frac_cb_qp_offset when determining the final value of the Qp'Cb quantization parameter. The value of slice_frac_cb_qp_offset is in the range of 0 to $2^K-1$, inclusive. When slice_frac_cb_qp_offset is not present, it is inferred to be equal to 0. The value of pps_cb_qp_offset+slice_cb_qp_offset is in the range of 0 to $2^K-1$, inclusive.

The slice_frac_cr_qp_offset specifies a difference to be added to the value of pps_frac_cr_qp_offset when determining the final value of the Qp'Cb quantization parameter. The value of slice_frac_cr_qp_offset is in the range of 0 to $2^K-1$, inclusive. When slice_frac_cr_qp_offset is not present, it is inferred to be equal to 0. The value of pps_cr_qp_offset+slice_cr_qp_offset is in the range of 0 to $2^K-1$, inclusive.

$$Qp_{Cb\_fracPrec}=((Qp_{Cb})<<K+pps\_frac\_cb\_qp\_\text{offset}+slice\_frac\_cb\_qp\_\text{offset})/(2^K)$$

$$Qp_{Cr\_fracPrec}=((Qp_{Cr})<<K+pps\_frac\_cr\_qp\_\text{offset}+slice\_frac\_cr\_qp\_\text{offset})/(2^K)$$

In this example, the fractional part of chroma qp offset may go up to $(2^K)-1$.

Here floating point representation QpCb_fracPrec is assumed. Then to define quantization step the common formula still can be used:

$$Q\text{step}(QP)=(2^{1/6})^{QP-4}$$

In the syntax tables above it is assumed that the same fractional precision (K) specified by pps_slice_chroma_frac_qp_offsets_precision is used both for picture level and slice level fractional QP offset. Note that different precisions may be used for picture and slice level offsets. In that case, the pps_slice_chroma_frac_qp_offsets_present_flag is replaced by pps_slice_chroma_frac_qp_offsets_precision. Moreover, instead of the precision field a binary flag may be used indicating some default value of precision (e.g., K=2).

Figure 5:
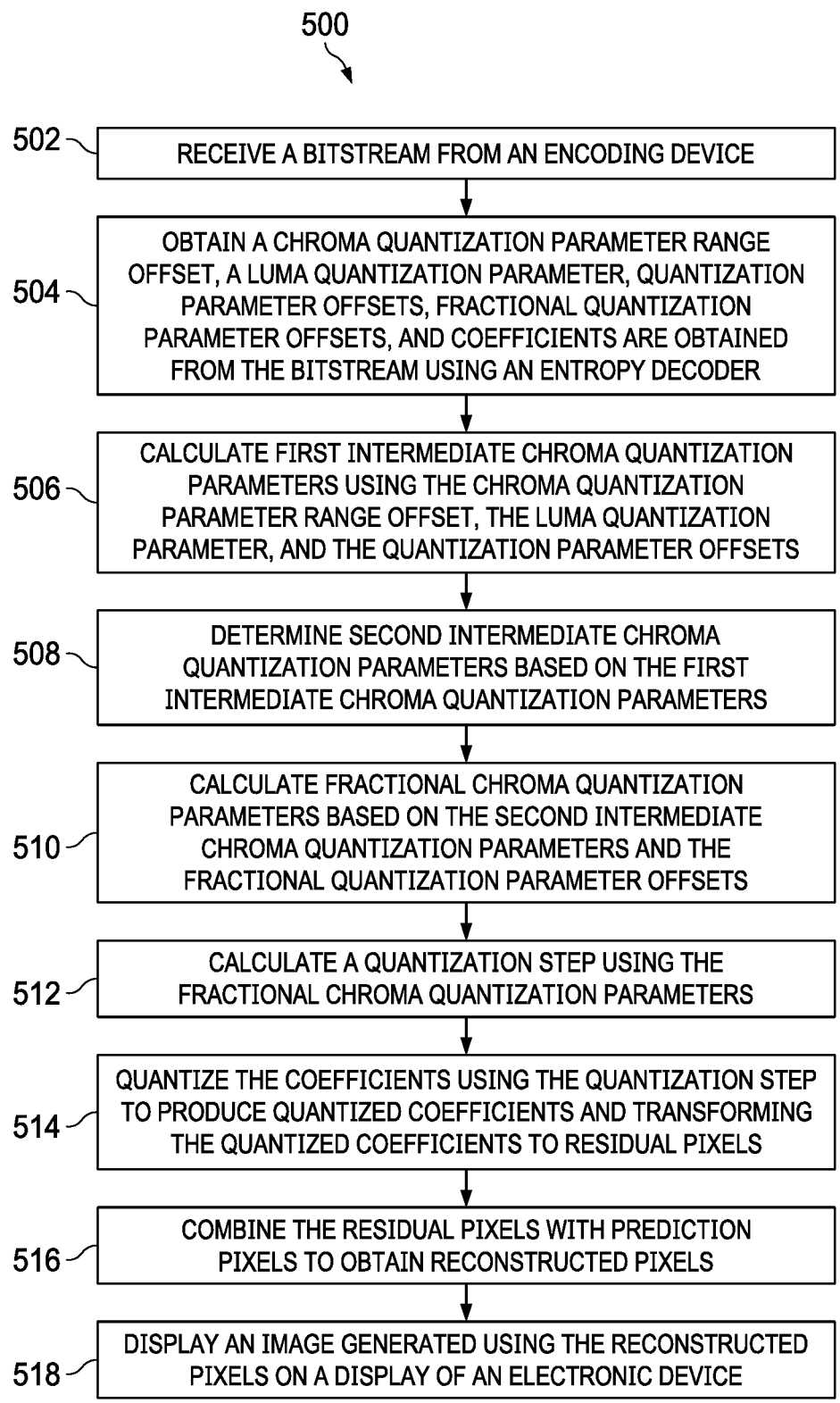
FIG. 5 is an embodiment of a coding method.

FIG. 5 is a flowchart illustrating an embodiment of a method of coding 500. The method of coding 500 may be performed by a decoder such as the video decoder 30 of FIG. 1. The method may be performed, for example, when coding with a finer, non-integer level of precision is desired.

In block 502, a bitstream is received from an encoding device such as the video encoder 20 in FIG. 1. In block 504, a chroma quantization parameter range offset (e.g., QpBDOffsetC), a luma quantization parameter (e.g., QpY), quantization parameter offsets (e.g., pps_cb_qp_offset, slice_cb_qp_offset, pps_cr_qp_offset, slice_cr_qp_offset), fractional quantization parameter offsets (e.g., pps_frac_cb_qp_offset, slice_frac_cb_qp_offset, pps_frac_cr_qp_offset, slice_frac_cr_qp_offset), and coefficients are obtained from the bitstream using an entropy decoder such as the entropy decoding unit 70 in FIG. 3.

In block 506, first intermediate chroma quantization parameters (e.g., qPiCb, qPiCr) are calculated using the chroma quantization parameter range offset, the luma quantization parameter, and the quantization parameter offsets. In block 508, second intermediate chroma quantization parameters (e.g., $QP_{Cb}$, $QP_{Cr}$) are determined based on the first intermediate chroma quantization parameters. In block 510, fractional chroma quantization parameters (e.g., $QP_{cb\_facPrec}$, $QP_{Cr\_fracPrec}$) are calculated based on the second intermediate chroma quantization parameters and the fractional quantization parameter offsets.

In block 512, a quantization step is calculated using the fractional chroma quantization parameters. In block 514, the coefficients are quantized using the quantization step to produce quantized coefficients and the quantized coefficients are transformed to residual pixels.

In block 516, the residual pixels are combined with prediction pixels to obtain reconstructed pixels. In block 518, an image generated using the reconstructed pixels is displayed on the display of an electronic device.

In another method, the fractional precision of quantization parameter is obtained using correspondence between index qPi and quantization parameter $Qp_C$ in Table 1. Remember, $Qp_C$ is a function of qPi($Qp_C$=F(qPi)). Therefore, qPi is derived the same as in conventional methods as described above. The $Qp_C$ with fractional precision is a weighted sum of the current and next values of Table 1.

$Qp_{Cb\_fracPrec}$=F(qPi)*(1.0−(pps_frac_cb_qp_offset+ slice_frac_cb_qp_offset)/(2^K))+F(qPi+1)* (pps_frac_cb_qp_offset+slice_frac_cb_qp_offset)/(2^K), $QP_{Cr\_fracPrec}$=F(qPi)*(1.0−(pps_frac_cr_qp_offset+ slice_frac_cr_qp_offset)/(2^K))+F(qPi+1)* (pps_frac_cr_qp_offset+slice_frac_cr_qp_offset)/(2^K), where K is level of fractional precision.

Figure 6:
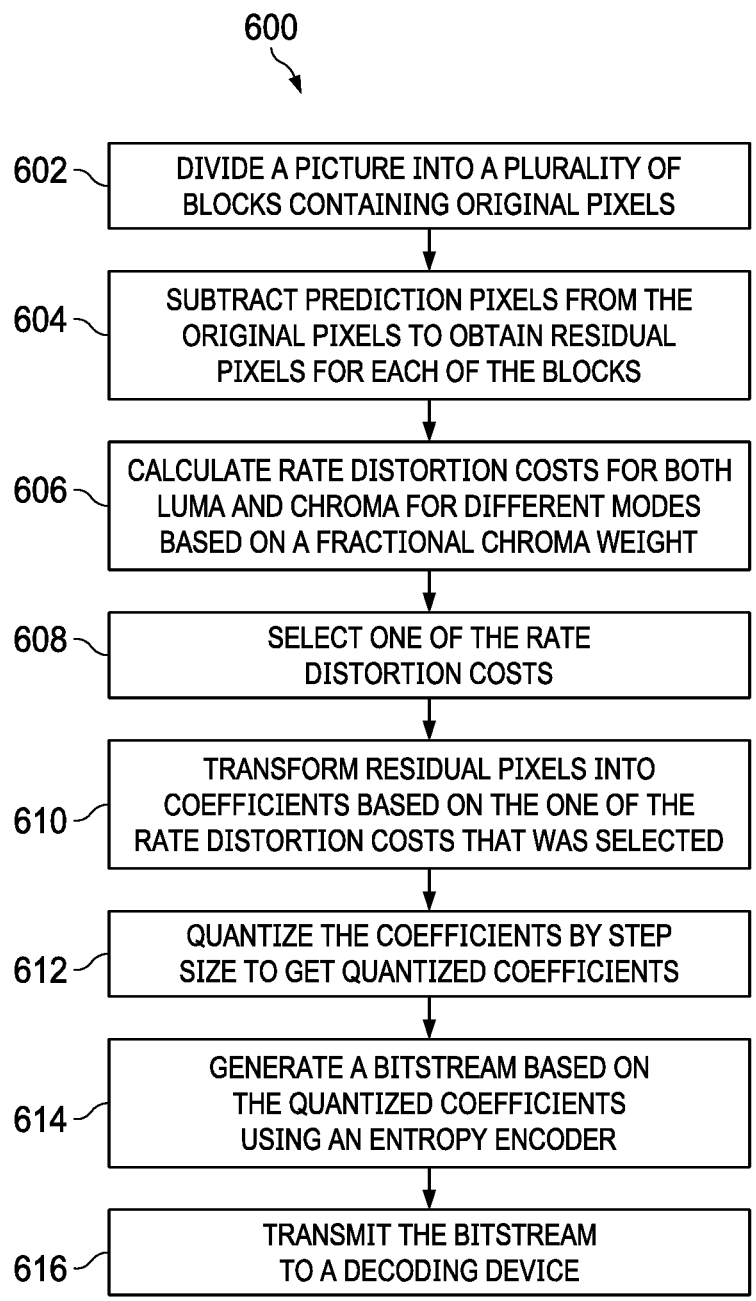
FIG. 6 is an embodiment of a coding method.

FIG. 6 is a flowchart illustrating an embodiment of a method of coding 600. The method of coding 600 may be performed by an encoder such as the video encoder 20 of FIG. 1. The method may be performed, for example, when coding with a finer, non-integer level of precision is desired.

In block 602, a picture is divided into a plurality of blocks containing original pixels. In block 604, prediction pixels are subtracted from the original pixels to obtain residual pixels for each of the blocks. In block 606, rate distortion costs are calculated for both luma and chroma for different modes based on a fractional chroma weight. In block 608, one of the rate distortion costs is selected.

In block 610, residual pixels are transformed into coefficients based on the one of the rate distortion costs that was selected. In block 612, the coefficients are quantized by step size to get quantized coefficients. In block 614, a bitstream is generated based on the quantized coefficients using an entropy encoder such as the entropy coding unit 56 in FIG. 2. In block 616, the bitstream is transmitted to a decoding device such as the video decoder 30 in FIG. 1.

In another method, the use of fractional chroma quantization parameter offset may be enabled during encoding process using existing (e.g., HEVC) solution. During the rate-distortion optimization procedure, unequal weights for luma and chroma distortion are usually used. Weight of chroma distortion is controlled by luma quantization parameter and chroma QP offset:

ChromaWeight=F(QPy+chroma_qp_offset)

In current coding techniques, the QPy and chroma_qp_offset may be only integer precision. To get more precise, ChromaWeight in a fractional position (e.g., 0.5, 0.25, 0.1, etc.) it is proposed to use weighted sum of current and next integer argument of function "F":

ChromaWeight$_{fracPrec}$=F(QPy+chroma_qp_offset)* (1.0−(pps_frac_cb_qp_offset+slice_frac_cb_qp_offset)/(2^K)+F(QPy+chroma_qp_offset)*(pps_frac_cb_qp_offset+slice_frac_cb_qp_offset)/(2^K).

Note that above descibed chroma weight modification can be applied to all coding tools and modes, the selection loop based on rate-distortion optimization criterion, and for particluar coding tools including in-loop filters such as sample adaptive offset (SAO), adaptive loop filtering (ALF), and so on.

In another method, it is proposed to allow the use of fractional delta QP for luma components at a coding block level. In one embodiment, the precision of block level (e.g., coding unit) delta QP may be ½. An example syntax table is illustrated below.

| | Descriptor |
|---|---|
| transform_unit( ... ) { | |
|   ... | |
|   if( cu_qp_delta_enabled_flag && !IsCuQpDeltaCoded ) { | |
|     cu_qp_delta_abs | ae(v) |
|     if( cu_qp_delta_abs ) | |
|       cu_qp_delta_sign_flag | ae(v) |
|   } | |
|   ... | |
| } | |

Note that in the above example syntax table, the "transform_unit" may be replaced by coding unit or coding block in general. In the above example syntax table, when fractional delta QP is enabled, in one embodiment, cu_qp_delta_abs specifies the absolute value of the difference CuQpDeltaVal between the luma quantization parameter of the current coding unit and its prediction multiplied by 2. In addition, the cu_qp_delta_sign_flag specifies the sign of CuQpDeltaVal as follows:

If cu_qp_delta_sign_flag is equal to 0, the corresponding CuQpDeltaVal has a positive value.

Otherwise (cu_qp_delta_sign_flag is equal to 1), the corresponding CuQpDeltaVal has a negative value.

When cu_qp_delta_sign_flag is not present, it is inferred to be equal to 0. When cu_qp_delta_abs is present, the variables IsCuQpDeltaCoded and CuQpDeltaVal are derived as follows:

IsCuQpDeltaCoded=1

CuQpDeltaVal=cu_qp_delta_abs*(1−2*cu_qp_delta_sign_flag)/2 which implies that CuQpDeltaVal here may be fractional.

These methods can be easily generalized to fractional precisions for value CuQpDeltaVal. In one example, the "/2" in above descriptions may be replaced by "/K", where precision value K may be transmitted in PPS. An example is presented below:

| | Descriptor |
|---|---|
| pic_parameter_set_rbsp( ) { | |
| ... | |
|   cu_qp_delta_enabled_flag | u(1) |
|   if( cu_qp_delta_enabled_flag ) | |
|   { | |
|     diff_cu_qp_delta_depth | ue(v) |
|     pps_frac_qp_delta_prec | ue(v) |
|   } | |
|   ... | |
| } | |

Figure 7:
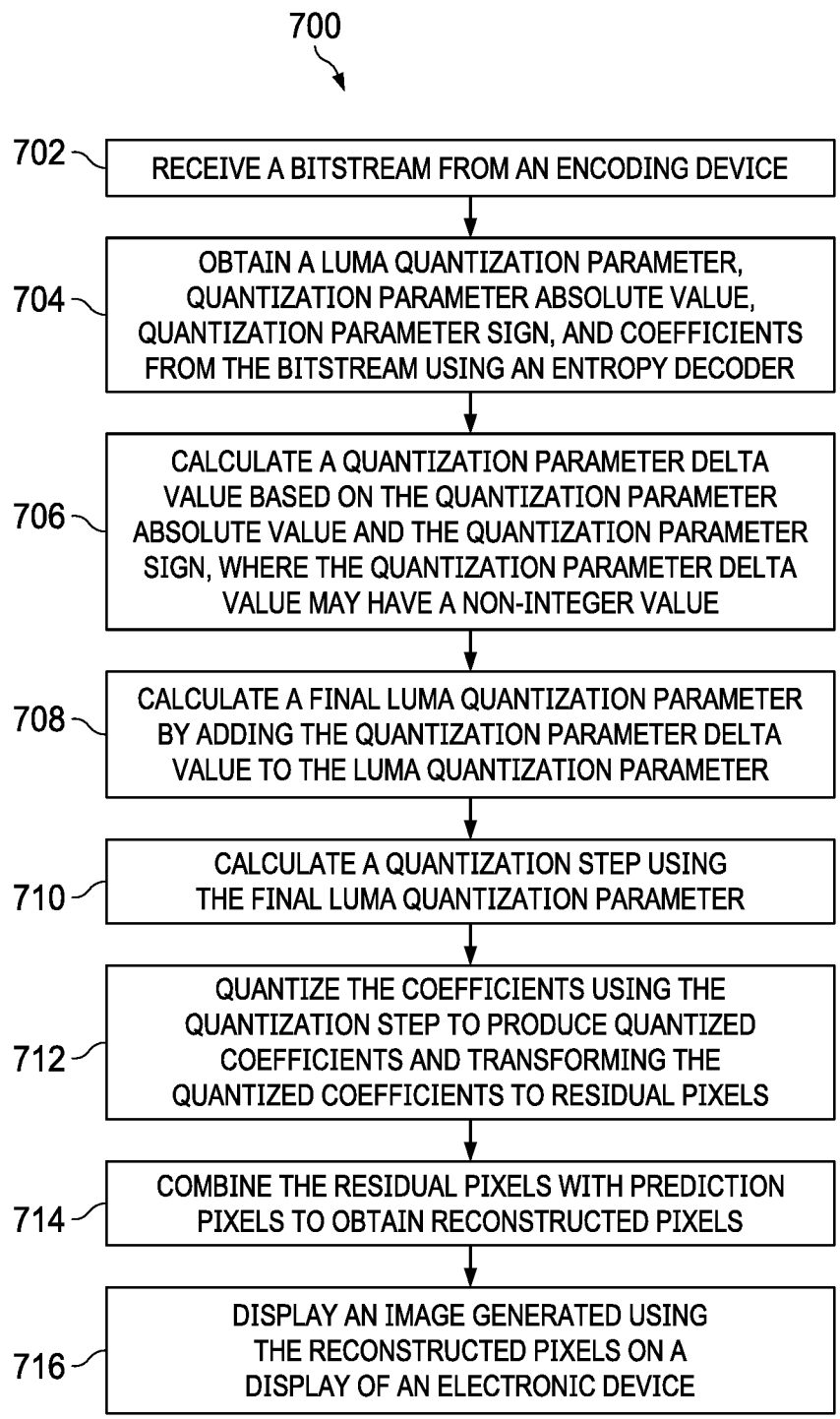
FIG. 7 is an embodiment of a coding method.

FIG. 7 is a flowchart illustrating an embodiment of a method of coding 700. The method of coding 700 may be performed by a decoder such as the video decoder 30 of FIG. 1. The method may be performed, for example, when coding with a finer, non-integer level of precision is desired.

In block 702, a bitstream is received from an encoding device such as the video encoder 20 in FIG. 1. In block 704, a luma quantization parameter (e.g., QpY), quantization parameter absolute value (e.g., cu_qp_delta_abs), quantization parameter sign (e.g., cu_qp_delta_sign_flag), and coefficients are obtained from the bitstream using an entropy decoder such as the entropy decoding unit 70 in FIG. 3. In block 706, a quantization parameter delta value (e.g., CuQpDeltaVal) is calculated based on the quantization parameter absolute value and the quantization parameter sign. The quantization parameter delta value may have a non-integer value.

In block 708, a final luma quantization parameter (e.g., Q'pY) is calculated by adding the quantization parameter delta value (e.g., CuQpDeltaVal) to the luma quantization parameter (e.g., QpY). In block 710, a quantization step is calculated using the final luma quantization parameter. In block 712, the coefficients are quantized using the quantization step to produce quantized coefficients and then the quantized coefficients are transformed to residual pixels.

In block 714, the residual pixels are combined with prediction pixels to obtain reconstructed pixels. In block 716, an image generated using the reconstructed pixels is displayed on the display of an electronic device.

From the foregoing, it should be recognized that existing solutions only allow signaling and thus use of an integer Chroma QP offset while the solutions in the present disclosure allow enabling a fractional chroma QP offset so that a finer level of chroma quality adjustment relevant to luma quality may be achieved. The existing solutions only allow signaling and thus use of integer block level delta QP while the solutions in the present disclosure allow enabling fractional delta QP offset for luma components at a coding block level such that a finer level of quality adjustment for local blocks and regions may be achieved.

Figure 8:
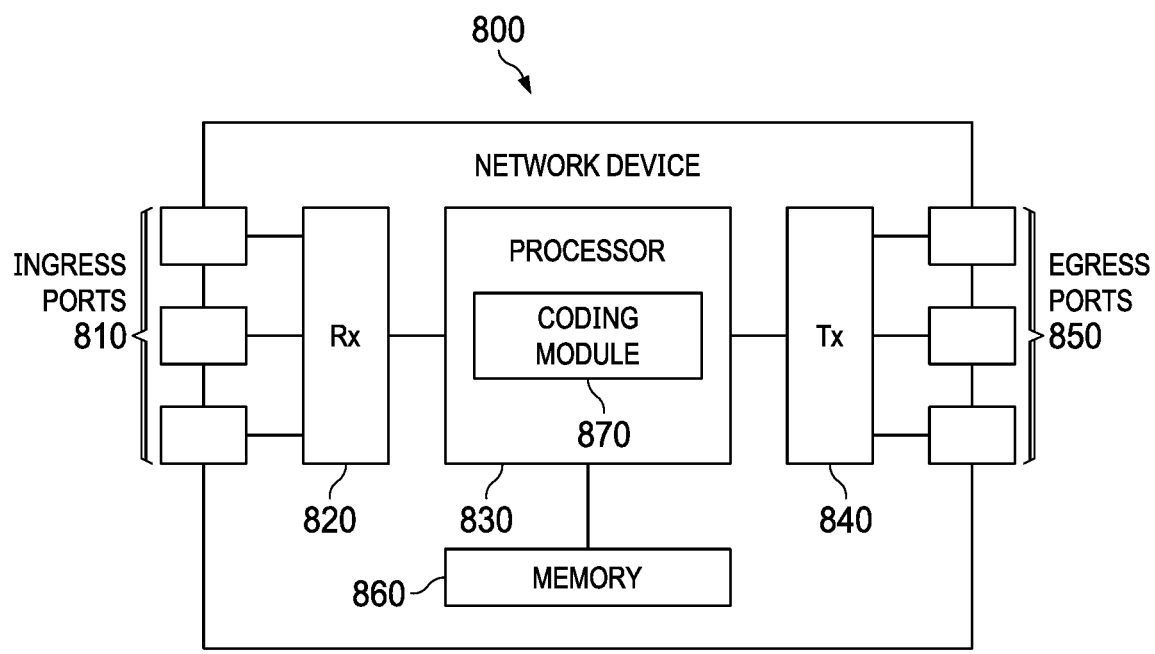
FIG. 8 is a schematic diagram of a network device (e.g., a coding device).

FIG. 8 is a schematic diagram of a network device 800 (e.g., coding device) according to an embodiment of the disclosure. The network device 800 is suitable for implementing the disclosed embodiments as described herein. The network device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The network device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a coding module 870. The coding module 870 implements the disclosed embodiments described above. For instance, the coding module 870 implements, processes, prepares, or provides the various coding operations. The inclusion of the coding module 870 therefore provides a substantial improvement to the functionality of the network device 800 and effects a transformation of the network device 800 to a different state. Alternatively, the coding module 870 is implemented as instructions stored in the memory 860 and executed by the processor 830.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random access memory (RAM), ternary content-addressable memory (TCAM), and/or static random-access memory (SRAM).

In an embodiment, a method of coding is implemented by a decoding means. The method includes receiving a bitstream from an encoding means; obtaining a chroma quantization parameter range offset, a luma quantization parameter, quantization parameter offsets, and coefficients from the bitstream using an entropy decoder; calculating first intermediate chroma quantization parameters using the chroma quantization parameter range offset, the luma quantization parameter, and the quantization parameter offsets; wherein one or more of the first intermediate chroma quantization parameters have non-integer values; determining second intermediate chroma quantization parameters based on the first intermediate chroma quantization parameters, wherein one or more of the second intermediate chroma quantization parameters have non-integer values; calculating final chroma quantization parameters based on the second intermediate chroma quantization parameters and the chroma quantization parameter range offset; calculating a quantization step using the final chroma quantization parameters; quantizing the coefficients using the quantization step to produce quantized coefficients and transforming the quantized coefficients to residual pixels; combining the residual pixels with prediction pixels to obtain reconstructed pixels; and displaying, on a display means of an electronic means, an image generated using the reconstructed pixels.

In an embodiment, a method of coding is implemented by a decoding means. The method includes receiving a bitstream from an encoding means; obtaining a chroma quantization parameter range offset, a luma quantization parameter, quantization parameter offsets, fractional quantization parameter offsets, and coefficients from the bitstream using an entropy decoder; calculating first intermediate chroma quantization parameters using the chroma quantization parameter range offset, the luma quantization parameter, and the quantization parameter offsets; determining second intermediate chroma quantization parameters based on the first intermediate chroma quantization parameters; calculating fractional chroma quantization parameters based on the second intermediate chroma quantization parameters and the fractional quantization parameter offsets; calculating a quantization step using the fractional chroma quantization parameters; quantizing the coefficients using the quantization step to produce quantized coefficients and transforming the quantized coefficients to residual pixels; combining the residual pixels with prediction pixels to obtain reconstructed pixels; and displaying, on a display means of an electronic means, an image generated using the reconstructed pixels.

In an embodiment, a method of coding implemented by an encoding means is provided. The method includes dividing a picture into a plurality of blocks containing original pixels; subtracting prediction pixels from the original pixels to obtain residual pixels for each of the blocks; calculating rate distortion costs for both luma and chroma for different modes based on a fractional chroma weight; selecting one of the rate distortion costs; transforming residual pixels into coefficients based on the one of the rate distortion costs that was selected; quantizing the coefficients by step size to get quantized coefficients; generating, using an entropy encoding means, a bitstream based on the quantized coefficients; and transmitting the bitstream to a decoding means.

In an embodiment, a method of coding is implemented by a decoding means. The method includes receiving a bitstream from an encoding means; obtaining a luma quantization parameter, quantization parameter absolute value, quantization parameter sign, and coefficients from the bitstream using an entropy decoder; calculating a quantization parameter delta value based on the quantization parameter absolute value and the quantization parameter sign, wherein the quantization parameter delta value has a non-integer value; calculating a final luma quantization parameter by adding the quantization parameter delta value to the luma quantization parameter; calculating a quantization step using the final luma quantization parameter; quantizing the coefficients using the quantization step to produce quantized coefficients and transforming the quantized coefficients to residual pixels; combining the residual pixels with prediction pixels to obtain reconstructed pixels; and displaying, on a display means of an electronic means, an image generated using the reconstructed pixels.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by a decoding device, comprising:
   receiving a bitstream from an encoding device;
   obtaining a chroma quantization parameter range offset, a luma quantization parameter, quantization parameter offsets, and coefficients from the bitstream using an entropy decoder of the decoding device;
   calculating first intermediate chroma quantization parameters using the chroma quantization parameter range offset, the luma quantization parameter, and the quantization parameter offsets, wherein one or more of the first intermediate chroma quantization parameters have non-integer values;
   determining second intermediate chroma quantization parameters based on the first intermediate chroma quantization parameters, wherein one or more of the second intermediate chroma quantization parameters based on the first intermediate chroma quantization parameters have non-integer values;
   calculating final chroma quantization parameters based on the second intermediate chroma quantization parameters and the chroma quantization parameter range offset;
   calculating a quantization step using the final chroma quantization parameters;
   quantizing the coefficients using the quantization step to produce quantized coefficients and transforming the quantized coefficients to residual pixels; and
   combining the residual pixels with prediction pixels to obtain reconstructed pixels.

2. The method of claim 1, wherein the first intermediate chroma quantization parameters are calculated according to:

$qPiCb = \text{Clip3}(-QpBd\text{Offset}C, 57, QpY+(pps\_cb\_qp\_\text{offset}+slice\_cb\_qp\_\text{offset})/2)$ $qPiCr = \text{Clip3}(-QpBd\text{Offset}C, 57, QpY+(pps\_cr\_qp\_\text{offset}+slice\_cr\_qp\_\text{offset})/2)$ $$\text{Clip3}(x, y, z) = \begin{cases} x; & z < x \\ y; & z > y \\ z; & \text{otherwise} \end{cases}, \quad QpBdOffsetC = 6*(\text{bit\_depth\_chroma}-8),$$

57 represents a maximum allowed value for qPiCb and qPiCr, QpY represents a basic luma quantization parameter for a current slice, and pps_cb_qp_offset, slice_cb_qp_offset, pps_cr_qp_offset, and slice_cr_qp_offset represent the quantization parameter offsets.

3. The method of claim 1, wherein the quantization parameter offsets comprise a picture parameter set quantization parameter offset and a slice quantization parameter offset, and wherein each of the first intermediate chroma quantization parameters is calculated by dividing a sum of the picture parameter set quantization parameter offset and the slice quantization parameter offset by 2.

4. The method of claim 1, wherein the second intermediate chroma quantization parameters are obtained by mapping the first intermediate chroma quantization parameters to the second intermediate chroma quantization parameters using a table.

5. The method of claim 1, wherein the second intermediate chroma quantization parameters are determined according to:

| qPi | <29 | 29 | 29.5 | 30 | 30.5 | 31 | 31.5 | 32 | 32.5 | 33 | 33.5 | 34 | 34.5 | 35 | 35.5 |
|---|---|---|---|---|---|---|---|---|---|---|---|---|---|---|---|
| $Qp_C$ | =qPi | 28.5 | 29 | 29 | 29.5 | 30 | 30.5 | 31 | 31.5 | 32 | 32.5 | 33 | 33 | 33.5 | 33.5 |

| qPi | 36 | 36.5 | 37 | 37.5 | 38 | 38.5 | 39 | 39.5 | 40 | 40.5 | 41 | 41.5 | 42 | 42.5 | 43 | >43 |
|---|---|---|---|---|---|---|---|---|---|---|---|---|---|---|---|---|
| $Qp_C$ | 34 | 34 | 34.5 | 34.5 | 35 | 35 | 35.5 | 35.5 | 36 | 36 | 36.5 | 36.5 | 37 | 37 | 37.5 | =qPi − 6 |

6. The method of claim 1, wherein the quantization parameter offsets are in a range of −24 to +24, inclusive.

7. The method of claim 1, wherein the quantization parameter offsets comprise a picture parameter set quantization parameter offset and a slice quantization parameter offset, and wherein each of the first chroma intermediate quantization parameters is calculated by dividing the picture parameter set quantization parameter offset by 2 to get a first quotient, dividing the slice quantization parameter offset by 2 to get a second quotient, and then summing the first quotient and the second quotient.

8. The method of claim 1, wherein the first intermediate chroma quantization parameters are calculated according to:

$qPiCb = \text{Clip3}(-QpBd\text{Offset}C, 57, QpY + (pps\_cb\_qp\_\text{offset} + slice\_cb\_qp\_\text{offset})/2)$ $qPiCr = \text{Clip3}(-QpBd\text{Offset}C, 57, QpY + (pps\_cr\_qp\_\text{offset} + slice\_cr\_qp\_\text{offset})/2)$ where $$\text{Clip3}(x, y, z) = \begin{cases} x; & z < x \\ y; & z > y \\ z; & \text{otherwise} \end{cases}, \quad QpBdOffsetC = 6*(\text{bit\_depth\_chroma} - 8),$$

57 represents maximum allowed value for qPiCb and qPiCr, QpY represents a basic luma quantization parameter for a current slice, and pps_cb_qp_offset, slice_cb_qp_offset, pps_cr_qp_offset, and slice_cr_qp_offset represent the quantization parameter offsets.

9. The method of claim 1, wherein the quantization parameter offsets comprise a picture parameter set quantization parameter offset and a slice quantization parameter offset, and wherein each of the picture parameter set quantization parameter offset and the slice quantization parameter offset is right shifted by 1.

10. The method of claim 1, wherein a precision of at least one of the first intermediate chroma quantization parameters and the second intermediate chroma quantization parameters is 0.5.

11. The method of claim 1, wherein the quantization step is calculated according to:

$Q\text{step}(QP) = (2^{1/6})^{QP-4}$ where QP represents the final chroma quantization parameters.

\* \* \* \* \*

UNITED STATES PATENT AND TRADEMARK OFFICE
CERTIFICATE OF CORRECTION

PATENT NO. : 11,019,339 B2
APPLICATION NO. : 16/029132
DATED : May 25, 2021
INVENTOR(S) : Shan Liu et al.

It is certified that error appears in the above-identified patent and that said Letters Patent is hereby corrected as shown below:

On the Title Page

Page 2, Column 2, Line 67, Item [56], should read:
Cao, X., et al., "AHG16 Unification of SDIP and NSQT," JCTVC-H0347, Feb. 1-10, 2012, 9 pages.

Page 3, Lines 17-18, should read:
Xu, X., et al., "Non-CE2: Intra BC merge mode with default candidates," JCTVC-S0123, Oct. 17-24, 2014, 7 pages.

Page 3, Lines 19-20, should read:
Xu, X., et al., "CE2 Test 3.2: Intra BC merge mode with default candidates," JCTVC-T0073, Feb. 10-18, 2015, 6 pages.

In the Claims

Column 28, Claim 2, Lines 32-52, should read:
2. The method of claim 1, wherein the first intermediate chroma quantization parameters are calculated according to:

$qPiCb = Clip3( -QpBdOffsetC, 57, QpY + (pps\_cb\_qp\_offset + slice\_cb\_qp\_offset) / 2)$
$qPiCr = Clip3( -QpBdOffsetC, 57, QpY + (pps\_cr\_qp\_offset + slice\_cr\_qp\_offset) / 2)$ where $Clip3(x,y,z) = \begin{cases} x; z < x \\ y; z > y \\ z; otherwise \end{cases}$, $QpBdOffsetC = 6 * (bit\_depth\_chroma - 8)$, 57 represents a maximum allowed value for qPiCb and qPiCr, QpY represents a basic luma quantization parameter for a current slice, and pps_cb_qp_offset, slice_cb_qp_offset, pps_cr_qp_offset, and slice_cr_qp_offset represent the quantization parameter offsets.

Column 29, Claim 8, Lines 24-37, through Column 30, Lines 13-19, should read:

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*

The method of claim 1, wherein the first intermediate chroma quantization parameters are calculated according to:

$qPiCb = Clip3(-QpBdOffsetC, 57, QpY + pps\_cb\_qp\_offset / 2 + slice\_cb\_qp\_offset / 2)$ $qPiCr = Clip3(-QpBdOffsetC, 57, QpY + (pps\_cr\_qp\_offset / 2 + slice\_cr\_qp\_offset / 2)$ where $Clip3(x,y,z) = \begin{cases} x; z < x \\ y; z > y \\ z; otherwise \end{cases}$, $QpBdOffsetC = 6 * (bit\_depth\_chroma - 8)$, 57 represents maximum allowed value for qPiCb and qPiCr, QpY represents a basic luma quantization parameter for a current slice, and pps_cb_qp_offset, slice_cb_qp_offset, pps_cr_qp_offset, and slice_cr_qp_offset represent the quantization parameter offsets.